United States Patent
Tomlinson et al.

(10) Patent No.: US 7,100,058 B1
(45) Date of Patent: Aug. 29, 2006

(54) PROGRAMMABLE POWER MANAGEMENT SYSTEM AND METHOD

(75) Inventors: Jock F. Tomlinson, Beaverton, OR (US); David C. Wilkinson, Austin, TX (US); James J. Bennett, Hillsboro, OR (US); Douglas C. Morse, Yamhill, OR (US)

(73) Assignee: Lattice Semiconductor Corporation, Hillsboro, OR (US)

( * ) Notice: Subject to any disclaimer, the term of this patent is extended or adjusted under 35 U.S.C. 154(b) by 295 days.

(21) Appl. No.: 10/726,972

(22) Filed: Dec. 3, 2003

Related U.S. Application Data

(63) Continuation of application No. 09/732,216, filed on Dec. 6, 2000, now Pat. No. 6,735,706.

(51) Int. Cl.
G06F 1/26 (2006.01)
G01N 27/416 (2006.01)

(52) U.S. Cl. .................. 713/300; 713/330; 324/426

(58) Field of Classification Search ................ 713/300, 713/330; 361/5, 6, 7, 103; 307/87; 324/426; 326/38, 33, 44
See application file for complete search history.

(56) References Cited

U.S. PATENT DOCUMENTS

| | | | |
|---|---|---|---|
| 4,890,005 A * | 12/1989 | Schornack | 307/87 |
| 5,175,845 A * | 12/1992 | Little | 713/323 |
| 5,332,929 A * | 7/1994 | Chiang | 327/538 |
| 5,560,022 A | 9/1996 | Dunstan | |
| 5,721,933 A | 2/1998 | Walsh | |
| 5,742,833 A | 4/1998 | Dea | |
| 5,751,164 A * | 5/1998 | Sharpe-Geisler et al. | 326/38 |
| 5,787,294 A | 7/1998 | Evoy | |
| 5,821,755 A * | 10/1998 | Henze | 324/426 |
| 5,872,983 A | 2/1999 | Walsh | |
| 6,430,444 B1 * | 8/2002 | Borza | 607/61 |
| 6,601,178 B1 | 7/2003 | Gulick | |
| 6,701,442 B1 * | 3/2004 | Kunz et al. | 713/300 |

OTHER PUBLICATIONS

U.S. Appl. No. 09/732,216, Tomlinson.

* cited by examiner

*Primary Examiner*—Thomas C. Lee
*Assistant Examiner*—Suresh K Suryawanshi

(57) ABSTRACT

A programmable power management integrated circuit includes analog input monitors that receive analog input signals that correspond to voltage, current, or temperature measurements. The analog input monitors apply programmable thresholds to the measurements and output the results to a programmable logic device, which may generate various status and/or control signals to the system being monitored. The programmable logic device controls FET drivers that can switch on and off power to the monitored system. The programmable power management integrated circuit may also comprise an internal oscillator, a serial interface, an in-system programmable interface, a joint test action group interface, a memory that stores identification information, and a register for capturing system information during power-down.

23 Claims, 12 Drawing Sheets

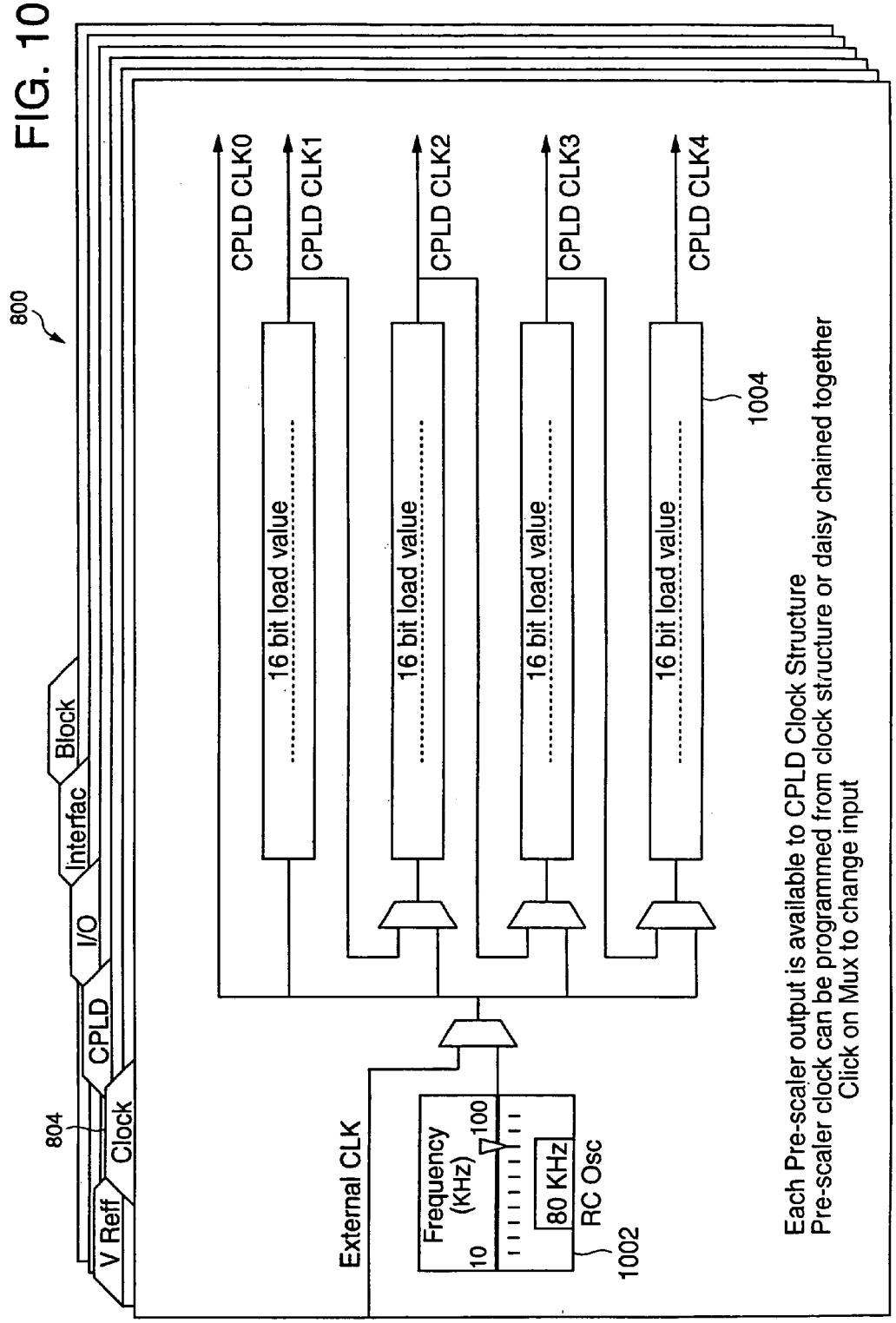

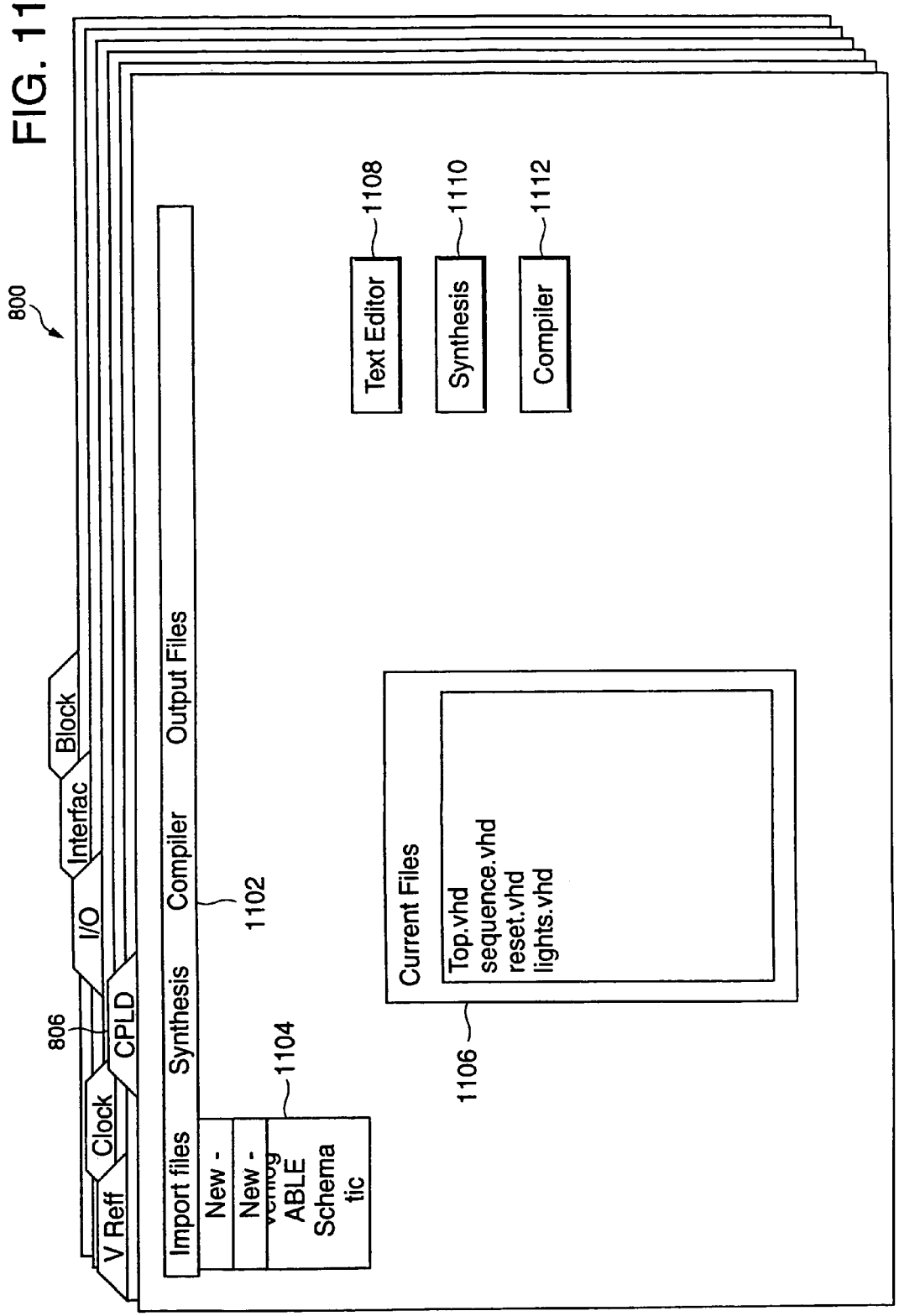

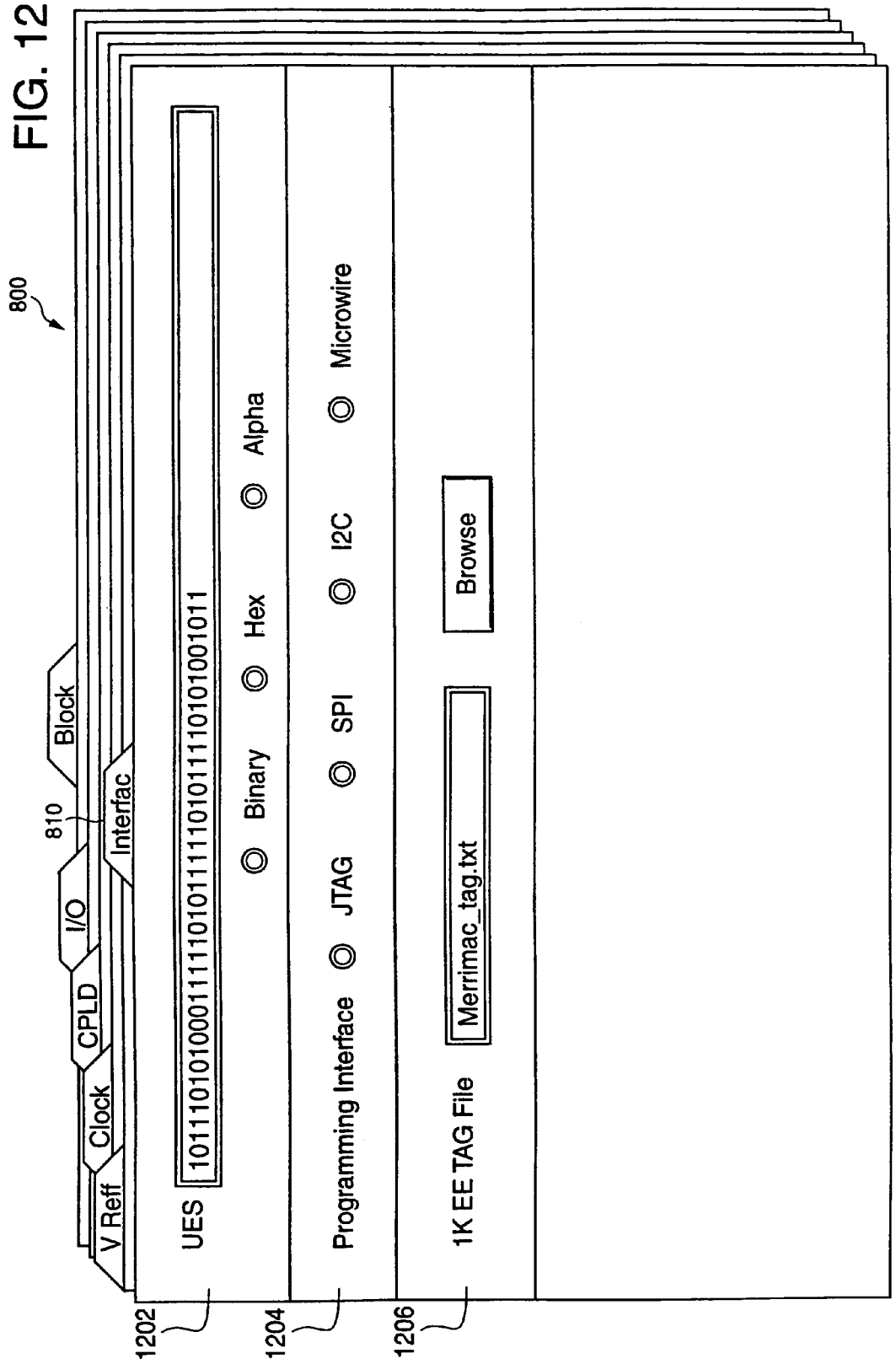

PROGRAMMABLE POWER MANAGEMENT SYSTEM AND METHOD

RELATED APPLICATION DATA

This application is a continuation of application Ser. No. 09/732,216, filed Dec. 6, 2000, now U.S. Pat. No. 6,735,706.

BACKGROUND OF THE INVENTION

1. Field of the Invention

The present invention relates generally to electronic devices and, more particularly, to programmable power management systems and methods.

2. Related Art

A typical electronic device, which includes one or more printed circuit boards that form a complex electronic system, requires multiple voltages for supplying power to numerous components. For example, the components may include a fan requiring 12 volts (V), memory devices requiring 2.5 V and 1.8 V, a microprocessor requiring 2.5 V and 1.8 V, analog circuits requiring 5 V, and logic devices requiring 5 V, 3.3 V, and 2.5 V. These components may further require a complex power-on or reset sequence that employs a timed, defined, reset signal. Additionally, many of these components cannot tolerate significant voltage swings or a power supply interruption and may require an interrupt or reset signal prior to powering down. Consequently, various portions of the printed circuit board or electronic system may require various voltages and a structured power up, power down, and reset sequence.

Failure to maintain the proper voltage level or to power down correctly may result in problems such as a static random access memory prematurely erasing required data or the entire system locking-up. A watchdog timer circuit may be required in case the system or processor locks-up in order to properly reset the system.

The system may also require thermal management to control the printed circuit board's thermal condition. For example, thermal management may control a fan speed based on temperature readings. Furthermore, the system may require a board level identification tag memory (e.g., a serial electrically erasable programmable read only memory) to identify and track the printed circuit board.

A conventional electronics system may monitor voltages, provide reset signals and power-loss warnings, or provide a watchdog circuit and battery backup switching. However, a drawback of conventional systems is that to perform these functions requires many discrete and specialized integrated circuits, which occupy valuable printed circuit board space. Furthermore, the identification tag memory along with the thermal management circuit, if these are included, are provided as stand-alone devices that occupy additional printed circuit board space and add to the size and complexity of the overall system.

Another drawback of these conventional systems is that generally there is no on-board logic for system control or sequencing. If programmable functions are permitted, it is only provided through resistor/capacitor networks that are external to the power management integrated circuits. Therefore, discrete components are required, additional board space is required, and limited control or options are provided. For example, the voltage, timing, polarity, and input/output signals are generally fixed or have limited versatility.

As a result, there is a need for a single device that will consolidate the functions of the various stand-alone power management devices and provide on-chip programmable functions.

SUMMARY OF THE INVENTION

In accordance with some embodiments of the present invention, programmable management systems and methods are provided that offer programmable voltage, current, and temperature diode monitoring capability having hysteresis and programmable thresholds and input filtering. An integrated CPLD allows user-defined power supply sequencing and generates reset and interrupt signals, system status, LED drive, and digital input and output signals, along with controlling a number of high-side FET drivers with soft turn-on capability. The programmable power management system integrates an internal oscillator, ID tag memory, serial interface (e.g., offering $I^2C$, SPI, microwire, and ISP standards), along with programmable watchdog timer support, and monitors multiple system voltages such as 5 V, 3.3 V, 2.5 V, and 1.8 V operation. Non-volatile programming may be employed utilizing $E^2CMOS$ for such functions as thresholds and configurations, CPLD, tag memory, and status capture register.

The present invention described herein provides significant advantages over conventional power management integrated circuits. The programmable power management systems and methods, in accordance with some embodiments, integrate a number of functions into a single in-system programmable chip. The chip performs not only power management functions, but may also provide thermal management and board identification such as with a tag memory. The chip functions may include multiple voltage, current, and/or temperature monitoring or input window comparisons, internal voltage references, programmable timers, interrupt control, complete reset function for the chip and/or the system, battery backup control, low battery warning, de-bounced pin reset, integrated serial EEPROM, integrated comparator, and CPLDs.

The chip also allows on-chip programmability for functions such as programmable tolerances for over/under voltages, programmable reset polarity (e.g., high-low-open drain), programmable time delay for power-on reset (POR) sequence (e.g., on and off), programmable time delay for reset upon voltage drop, programmable output signal polarity, programmable open drain or open collector, programmable timer and time-out duration, programmable interrupt duration, programmable extended sleep mode/wakeup function, programmable memory (e.g., $E^2$ tag for board identification), programmable comparator, and CPLD logic. Thus, the programmable power management system and method may provide not only power management functions, but also thermal management, memory, and on-board logic for programmable functions such as system control or sequencing and accept or provide input/output signals that are versatile in terms such as voltage, timing, and polarity.

In accordance with an embodiment of the present invention, a programmable power management integrated circuit includes input terminals that receive analog input signals and programmable input/output terminals. A programmable logic circuit is coupled to a first group of input terminals and provides at least a reset signal, an interrupt signal, a status signal, or a control signal through the first group of input/output terminals. Analog input monitors, coupled to the input terminals, monitor voltage, current, and temperature signals and compare these signals to programmable thresholds, with the result provided to the programmable logic circuit. The integrated circuit may also include FET drivers, a serial interface, a capture register, an oscillator, a prescaler circuit, a temperature diode, an ISP/JTAG interface, a tag memory, and a capture register. The integrated circuit may be programmed through a graphical user interface having selectable screen displays corresponding to various programmable chip functions or values.

In accordance with another embodiment of the present invention, a programmable system management integrated circuit includes input terminals, which receive analog input signals, and programmable input/output terminals, which receive or provide digital signals. A programmable analog circuit is coupled to one or more of the input terminals and provides one or more output signals. A programmable logic circuit receives the output signals and provides its own output signals through the programmable input/output terminals.

A more complete understanding of the programmable management systems and methods will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 10 illustrates a graphical user interface for designating clock functions for a programmable power management system in accordance with an embodiment of the present invention.

FIG. 11 illustrates a graphical user interface for programming a complex programmable logic device for a programmable power management system in accordance with an embodiment of the present invention.

FIG. 12 illustrates a graphical user interface for selecting interfaces for a programmable power management system in accordance with an embodiment of the present invention.

DETAILED DESCRIPTION OF THE INVENTION

Figure 1:
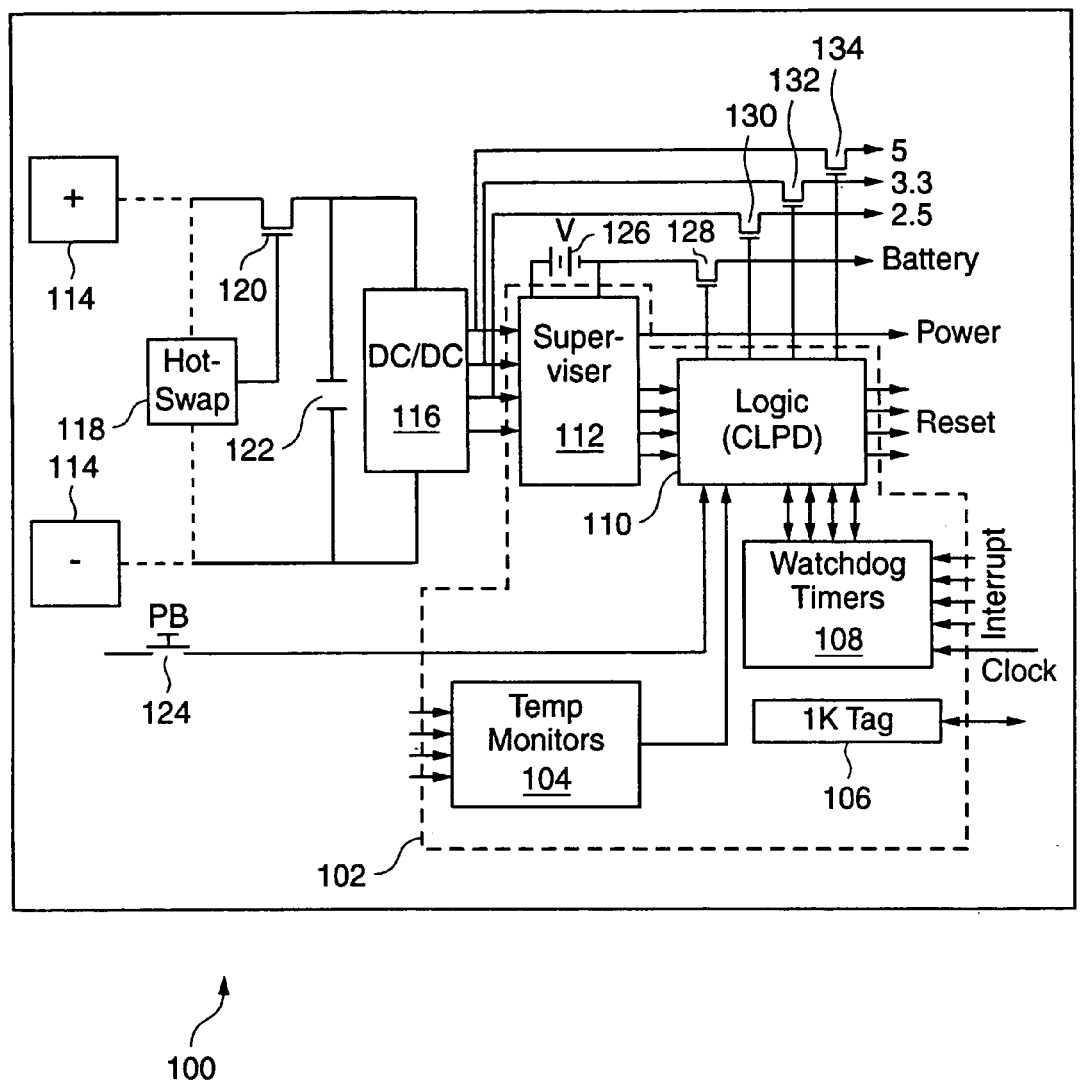
FIG. 1 illustrates an exemplary system block diagram incorporating a programmable power management system in accordance with an embodiment of the present invention.

FIG. 1 illustrates an exemplary block diagram for a system 100 incorporating a programmable power management system 102 in accordance with an embodiment of the present invention. System 100, which illustrates a portion of an electronic device or system, includes a high direct-current (DC) supply voltage 114 having positive and negative terminals that feed a DC-to-DC (DC/DC) converter 116. A capacitor 122 provides signal conditioning and a hot-swap selector 118 controls a transistor 120 that allows the selection of supply voltage 114. DC/DC converter 116 generates a number of DC voltage outputs that are monitored by programmable power management system 102 and that are also supplied to various components of the electronic device (not shown). For example, DC/DC converter 116 may generate DC voltages of 5 V, 3.3 V, 2.5 V, and 1.8 V.

Programmable power management system 102 includes a supervisor circuit 112, logic circuit 110, watchdog timers 108, a memory (e.g., 1 K tag memory) 106, and temperature monitors 104. Supervisor circuit 112 receives the DC voltages generated by DC/DC converter 116 and monitors the voltages and/or currents against predetermined limits. Supervisor circuit 112 also monitors a voltage and/or current of a battery 126 that, for example, provides battery backup capability for system 100. Supervisory circuit 112 determines whether the monitored signals are within programmable tolerance limits and provides the results or system status to logic circuit 110. In this embodiment, logic circuit 110 is implemented using a complex programmable logic device (CPLD) circuit to provide functions such as sequencing, control, and/or driver control.

Temperature monitors 104 monitor the temperature of various components of system 100, including programmable power management system 102, and provide the result or status to logic circuit 110. Similarly, watchdog timers 108 monitor clock and interrupt signals and provide the result or status to logic circuit 110. Logic circuit 110 receives these status or input signals, along with a push-button (PB) reset signal 124, and determines the appropriate action. For example, logic circuit 110 may generate one or more reset signals to various components of system 100 or switch or cycle one or more backup voltages or DC voltage supplies. As shown, logic circuit 110 can switch on or off the 5 V, 3.3 V, 2.5 V, or battery voltage through respective transistor switches 134, 132, 130, and 128.

Programmable power management system 102 also includes memory 106. As an example, memory 106 may store one kilobit (1 Kbit) of data, which may provide board identification information. Memory device 106 may include an electrically erasable programmable read-only memory ($E^2$PROM) or other types of memory devices such as a PROM or an erasable PROM. Programmable power management system 102 provides many necessary system functions such as power supply voltage and current supervisory monitoring, reset/interrupt generation, hot insertion controller, thermal monitoring, board identification (ID), and one or more programmable timers.

Figure 2:
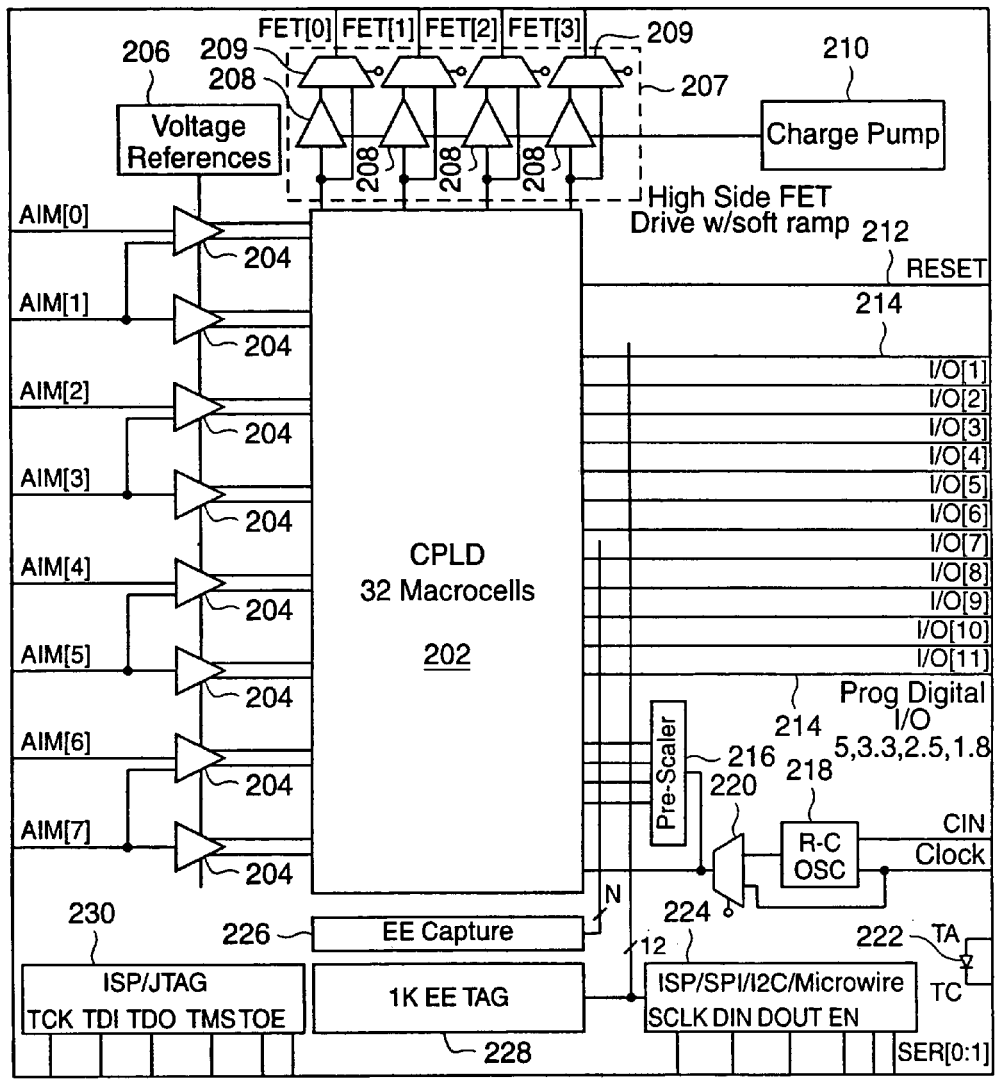
FIG. 2 shows a block diagram illustrating power management functions of a programmable power management system in accordance with an embodiment of the present invention.

FIG. 2 shows a block diagram illustrating power management functions of a programmable power management system 200 in accordance with an embodiment of the present invention. Programmable power management system 200 includes a CPLD 202, analog input monitors (AIMs) 204, voltage references generator 206, field-effect transistor (FET) drivers 207, a charge pump 210, a reset terminal 212, input/output (I/O) terminals 214, a pre-scaler circuit 216, an oscillator 218, a temperature diode 222, serial interface 224, an electrically erasable (EE) capture register 226, a tag memory 228, and an in-system programmable (ISP)/JTAG interface 230.

Programmable power management system 200 includes a number of AIMs 204 (e.g., AIM[0] through AIM[7]). Each AIM 204 can perform multiple functions and has many programmable options, described in greater detail below in reference to FIG. 3. For example, AIM 204 provides generic input pins for monitoring voltages and currents, which are compared against adjacent inputs or preset programmable thresholds. Voltage references generator 206 provides programmable voltage references that are used by each AIM 204. AIM 204 generates output signals that are fed to CPLD 202, which utilizes these output signals to generate output signals which can be used for alarm, reset, interrupt, or light-emitting diode (LED) indicator signals. The output signals generated by CPLD 202 may be modified or also determined from other digital status signals that are received. CPLD 202, for example, may include a number of macrocells (e.g., 32) that provide programmable logic functions through a programmable array of logic gates (e.g., sum of products). As an example, a 32-macrocell CPLD such as those used in the 2032 family of ISP high-density PLDs from Lattice Semiconductor Corporation may be utilized, with a speed of 1–200 MHz being sufficient.

CPLD 202 also controls a number of soft turn-on FET drivers 207 for power supply sequencing with programmable turn-on/turn-off conditions. For example, four soft turn-on FET drivers 207 are illustrated as including buffers 208 (e.g., operational amplifiers) and multiplexers 209. FET drivers 207 are driven by output signals of CPLD 202 (i.e., a number of power FET driver output pins FET[0] to FET[3]) and are capable of supplying the voltage necessary to operate N-channel "high-side" FETs (not shown). N-channel FETs are typically used to control high-current power supplies and are preferred due to the low turn-on and on-state resistance (Ron). As an example, a soft ramp capability is provided for FET drivers 207 that provides four settings, with the ramps generally monotonic and linear to within five percent and having a programmable turn-on ramp time and discharge characteristic of 'fast' or "slow." FET driver output pins of CPLD 202 may also be configured as complementary metal-oxide semiconductor (CMOS) digital output terminals.

Charge pump 210 generates an internal charge for providing voltages above supply voltage (i.e., Vcc) within programmable power management system 200 for the high-side FET drivers 207. Because N-channel devices are typically used for their low on-resistance "Ron" and gate-to-source voltage "Vgs" specifications in the range of 2.7 V to 10 V, charge pump 210 must create the appropriate Vgs for the supply voltage provided. As an example, charge pump 210 typically must generate voltage levels of about two times the supply voltage. The voltage provided by charge pump 210 is provided to buffers 208, which condition the voltage and output the voltage to multiplexer 209. Multiplexer 209, which may be controlled by an $E^2$ cell, selects the desired voltage, provided by buffer 208 and CPLD 202, for controlling the N-channel FETs. Thus, FET drivers 207 can supply a pumped voltage for the high-side drive of power NFETs.

Charge pump 210 may also supply the high-side power for other portions of programmable power management system 200 such as for current-sense differential amplifiers within each AIM 204 (discussed in detail below in reference to FIG. 3). Because current sense occurs on the positive supply rail, the differential amplifiers must operate close to the supply rail. By using an elevated supply voltage, the differential amplifier design requirements may be relaxed.

Programmable power management system 200 permits a number of input and output signals through various pins. For example, reset terminal 212 allows a reset signal to be received to reset programmable power management system 200, such as for CPLD 202 and various counters, or for programmable power management system 200 to generate a complete system reset. I/O terminals 214 (e.g., I/O[0] through I/O[11]) provide a plurality of programmable digital input and output signals. For example, standard CPLD I/O macrocells may be used for digital signals that support various voltage levels such as 5 V, 3.3 V, 2.5 V, and 1.8 V with low voltage transistor—transistor logic (LVTTL) I/O capability and that have an open-drain and/or open-source capability that is configurable. Generally, I/O terminals 214 do not need to provide a drive above the supply rail (i.e., supply voltage), though there may be some tolerance for one or more I/O signal levels that are higher than the supply rail. I/O terminals 214 may, for example, receive or provide CMOS digital input/output signals.

Figure 4:
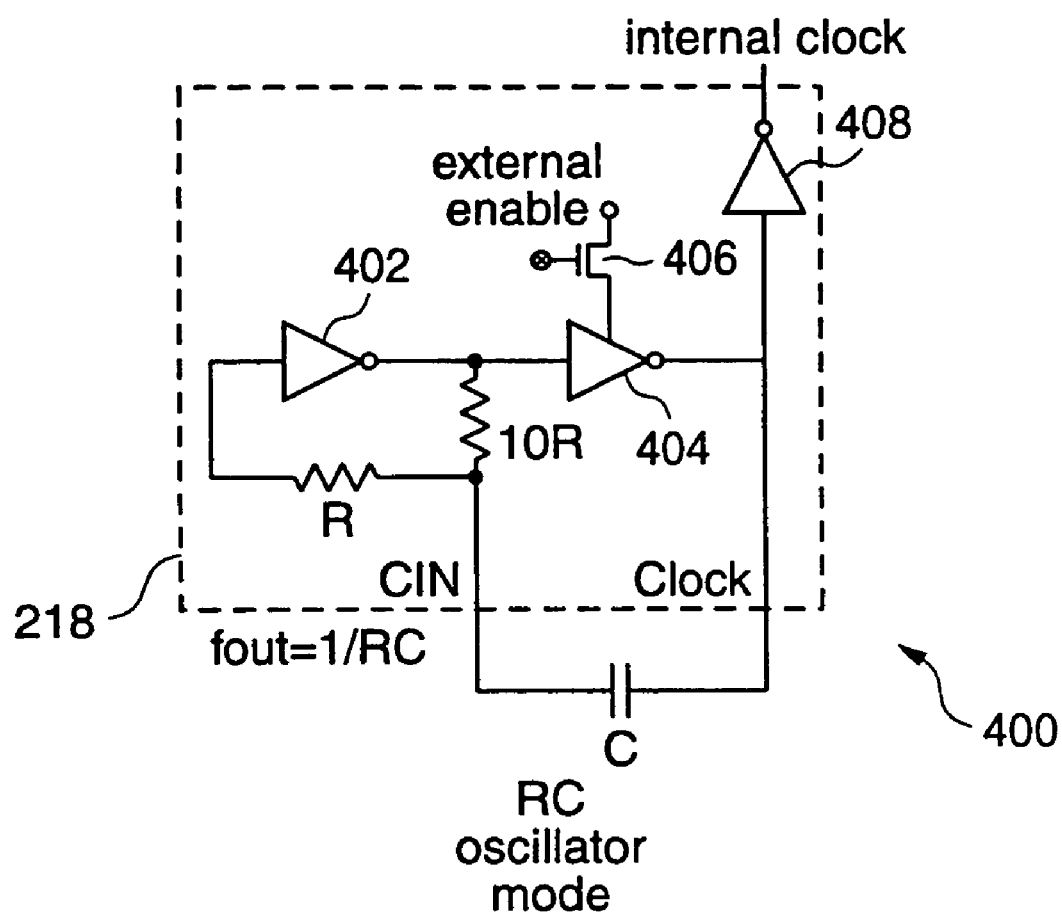
FIG. 4 shows a schematic block diagram of an oscillator for a programmable power management system in accordance with an embodiment of the present invention.
Figure 5:
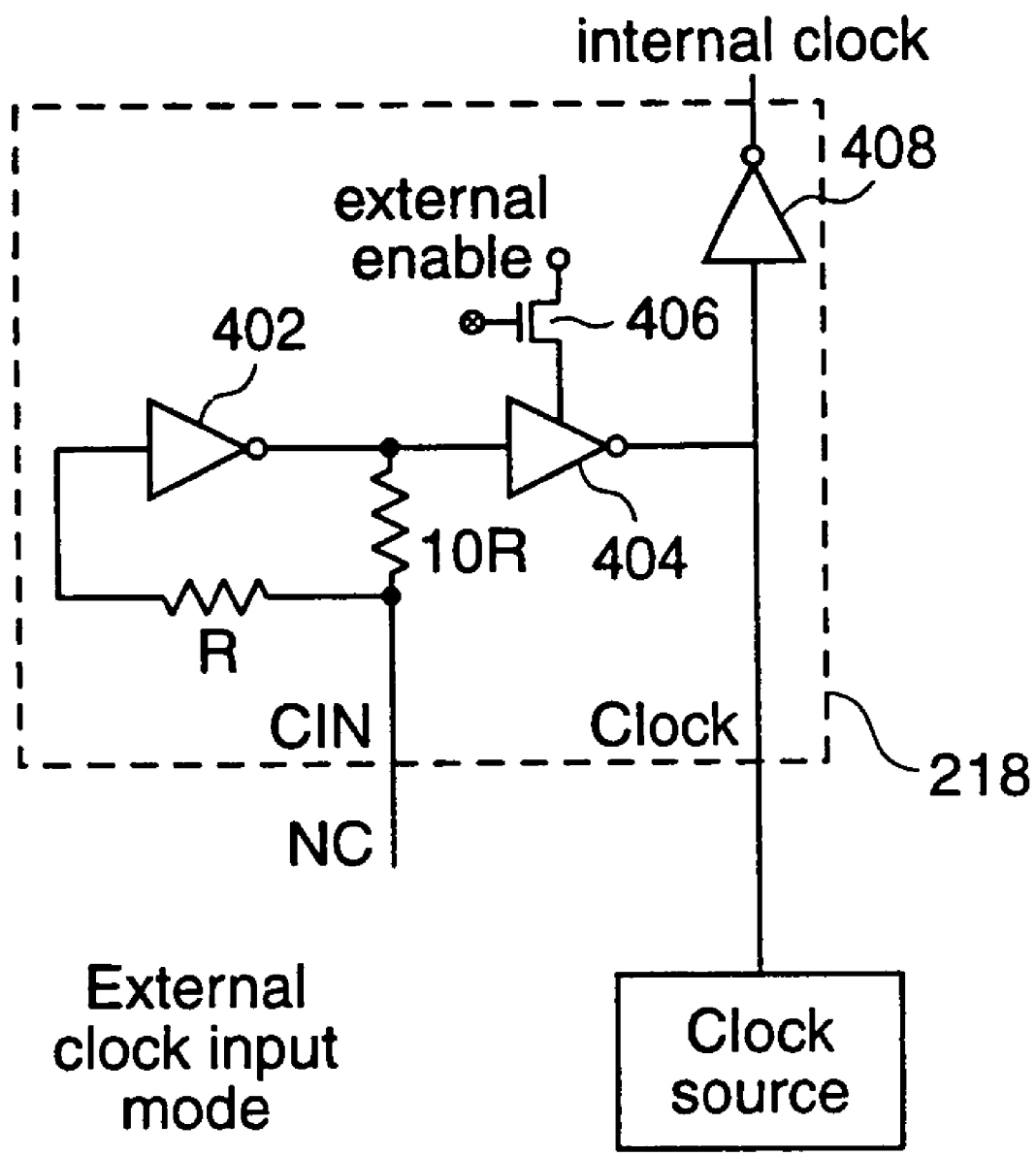
FIG. 5 shows a schematic block diagram of the oscillator of FIG. 4 configured for an external clock input signal in accordance with an embodiment of the present invention.

Oscillator 218 may generate an internal clock signal or receive an external clock signal to provide timing for CPLD 202, as described in greater detail in reference to FIGS. 4 and 5. An external clock input signal (Clock) or oscillator 218, formed by connecting an appropriate capacitor across Clock and CIN (capacitor input) pins, provide for an external clock signal or an internally generated resistor-capacitor (R-C) oscillator, respectively. Oscillator 218 provides an inexpensive and reliable clock source for autonomous operation. As an example, the range of frequencies for oscillator 218 may be between 10 KHz and 10 MHz with an accuracy of +/−10%. Multiplexer 220, which may be controlled by an $E^2$ cell, selects the clock source as either internal using oscillator 218 or external provided through Clock input terminal. If the external clock is selected, the input threshold should support system voltage levels such as 5 V, 3.3 V, 2.5 V, and 1.8 V. The clock signal, either from an external source or from oscillator 218, clocks CPLD 202 and "self-zeroes" various amplifiers and charge pump 210.

The clock output signal from multiplexer 220 is connected to a global clock line of CPLD 202 and to pre-scaler circuit 216. Pre-scaler circuit 216 includes four loadable 16-bit down counters (not shown), with the pre-load values programmable from an $E^2$ register. Each counter outputs a clock edge when its count reaches zero. The counter then reloads the pre-load value and begins counting down again. The counters may also be chained together to operate in pairs or as a group of four. As shown, four output signals from pre-scaler circuit 216, one from each terminal count pin, are connected to a separate global clock pin within CPLD 202. A user may then use any of the four counter output signals within CPLD 202.

Temperature diode 222 includes a single PN junction diode, connected across pins TA and TC, that provides a signal representing a junction temperature for programmable power management system 200. As an example, temperature diode 222 may be connected along with the other temperature diode monitor input terminals to allow a self-monitoring capability along with the monitoring of other external electronic device or system components. As an example, AIM 204 may monitor temperature diode 222 and provide an output signal representing a high, a low, or a nominal temperature that is selectable in five-degree increments.

Serial interface 224 supports SPI, I²C, and microwire serial interface protocols. The particular mode or port type is selected using two serial input pins (SER[0:1]) that, for example, are strapped high or low to select the interface protocol type. SER[0:1] pins may also be allowed to float, resulting in serial interface 224 defaulting to the SPI serial interface protocol as a result of internal pull-ups. SER[0:1] pins may also be configured using configuration fuses. Serial interface 224 also may be configured through ISP/JTAG interface 230 or may be used instead of ISP/JTAG interface 230 to configure programmable power management system 200. Serial interface 224 includes a clock pin (SCLK), a data input pin (DIN), a data output pin (DOUT), and an enable pin (EN).

EE capture register 226 includes a status capture register (e.g., an 8-bit register) that is shadowed by an $E^2$ register. A serial interface (not shown), connected internally to three digital input/output pins of CPLD 202, is utilized to write status capture bits to EE capture register 226. For example, a Din pin may be used to shift data into the status capture register, a clock (Clk) pin clocks the data into the status capture register on rising clock edges, and a write enable (We) pin causes the shifted data to be written into the $E^2$ register. The serial interface can be used to read the contents of EE capture register 226 and allow the status of the system and programmable power management system 200 to be captured and retained after power-down to provide postmortem information about system power-down conditions.

Tag memory 228 includes a memory device that stores various data such as system or printed circuit board identification (ID) information. Tag memory 228 may include, for example, a serial electrically erasable programmable read only memory (EEPROM) ID tag memory storing one kilobit of data. Tag memory 228 may include other types of memory devices such as a ROM, a PROM, or an erasable PROM, to name but a few. Tag memory 228 is generally accessed (i.e., read from or written to) through serial interface 224.

ISP/JTAG interface 230 is provided to support IEEE (Institute of Electrical and Electronics Engineers) 1149 test as well as ISP configuration. JTAG employs test signals that correspond to the IEEE standard for boundary scan technology, which utilizes certain input/output pins for testing the input/output cells of the chip on the printed circuit board. ISP/JTAG interface 230 allows the scanning of all digital pins at a minimum, but may allow various other test methods from a full scan to a partial scan test to be employed to fully test all or a portion of the chip. The ISP configuration of ISP/JTAG interface 230 includes tag memory 228, the fuse map of CPLD 202, the configuration fuses for AIMs 204, the registers of pre-scaler 216, clock selection for $E^2$ cell 220, input/output configurations such as for I/O 214, and configuration fuses for FET drivers 207.

Various input/output pins are shown for ISP/JTAG interface 230. TCK pin receives a serial data clock, TMS pin receives a control signal, TDI pin receives serial data, and TDO pin outputs serial data during ISP programming or boundary scan mode. TOE ("test output enable") pin tristates all I/O pins when a logic low signal is received.

Programmable power management system 200 performs a number of functions that may be incorporated onto a single in-system programmable integrated circuit (IC) that performs a superset of power management tasks. For example, programmable power management system 200 offers programmable voltage, current, and temperature diode monitoring capabilities including modeling for hysteresis and programmable thresholds and input filtering. An integrated CPLD allows user-defined power supply sequencing and generates reset and interrupt signals, system status, LED drive, and digital input and output signals, along with controlling a number of high-side FET drivers with soft turn-on capability. Programmable power management system 200 integrates an internal oscillator, ID tag memory, serial interface offering I2C, SPI, microwire, and ISP standards, along with programmable watchdog timer support, and monitors multiple system voltages such as 5 V, 3.3 V, 2.5 V, and 1.8 V operation. Non-volatile programming may be employed utilizing $E^2CMOS$ for thresholds and configurations, CPLD, tag memory, and status capture register.

Programmable power management system 200 performs these multitude of functions on a single IC (also referred to as a chip) with suitable leads or other connecting points (e.g., pins or terminals) extending for receiving or generating various signals or other data. For example, programmable power management system 200 may include a 48-pin thin quad-flatpack chip that utilizes significantly less printed circuit board space than conventional power management systems.

Table 1 summarizes an exemplary pin assignment for programmable power management system 200. Programmable power management system 200 may include more or less inputs and outputs than those shown, with the input and output terminals pertaining to power and thermal management functions being the same or different than what is shown and described herein. Power management along with thermal management, ID tag memory, and fault identification may all be provided by programmable power management system 200.

TABLE 1

Description of Exemplary Input and Output Pins

| Signal Nam | Pin | Dir | Input type | Output type | Description |
|---|---|---|---|---|---|
| AIM[0:7] | 8 | I | A | N/A | Analog input monitor pin |
| FET[0:3] | 4 | O | N/A | A/D | Power FET driver output |
| I/O[0:11] | 12 | I/O | D | D | CMOS digital I/O |
| CIN | 1 | I | A | N/A | Capacitor Input |
| CLOCK | 1 | I | A/D | N/A | Clock input |
| TA, TC | 2 | | A | A | Diode A and C terminals |
| SCLK | 1 | I | D | N/A | Serial clock pin |
| DIN | 1 | I | D | N/A | Serial data input pin |
| DOUT | 1 | O | N/A | D | Serial data output pin |
| EN | 1 | I | D | N/A | Serial enable pin |
| TDI | 1 | I | D | N/A | Serial data Input Pin |
| TCK | 1 | I | D | N/A | Serial data Input Pin |
| TMS | 1 | I | D | N/A | Control Input Pin |
| TDO | 1 | O | N/A | D | Serial data Output Pin |
| RESET | 1 | I | D | N/A | Reset input |
| TOE | 1 | I | D | N/A | Test Output Enable pin |
| SER[0:1] | 2 | I | DP | N/A | Serial port type selector |
| VCCio | 2 | | | | Prefer multiple supplies |
| GND | 3 | | | | Ground |
| VCC | 3 | | | | Voltage Source |
| Total | 48 | | | | |

Figure 3:
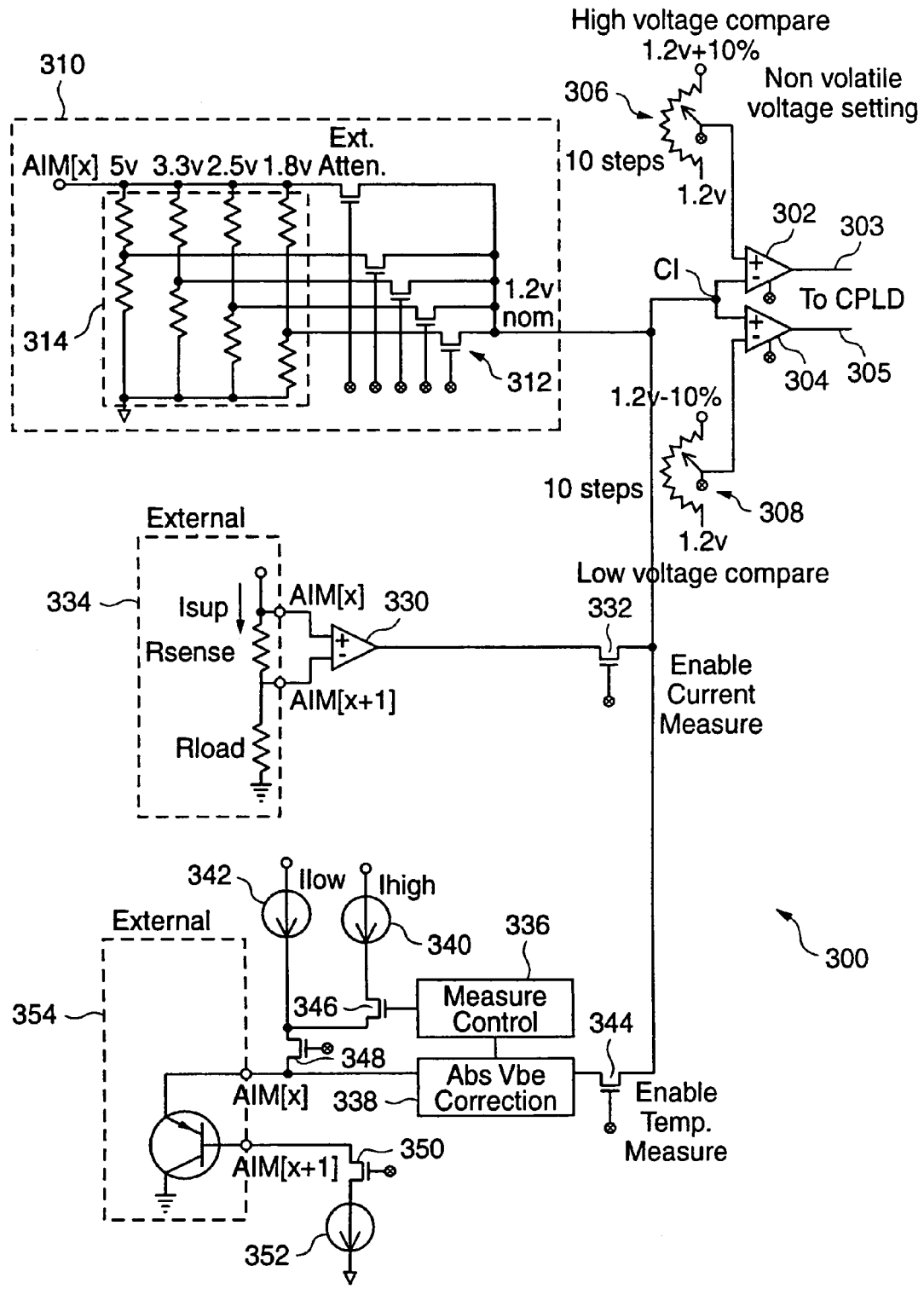
FIG. 3 shows a schematic block diagram illustrating analog input monitors for a programmable power management system in accordance with an embodiment of the present invention.

FIG. 3 shows a schematic block diagram of one circuit implementation 300 of AIM 204 in programmable power management system 200. Each AIM 204 can be used for multiple purposes such as voltage monitoring, current monitoring, and diode bias and temperature monitoring.

As shown in FIG. 3, circuit 300 includes voltage comparators 302 and 304 having a common input (CI) node that provides the voltage to be monitored. For example, voltage comparators may be selected to have an input offset voltage of 5–10 mV and a common mode range of 1–1.5 V. Programmable voltage thresholds 306 and 308 each provide a programmable voltage reference that is used by respective voltage comparators 302 and 304 to provide respective output voltages 303 and 305 to CPLD 202.

As discussed above, CPLD 202 utilizes the output signals of voltage comparators 302 and 304. Programmable voltage thresholds 306 and 308 establish high and low voltage thresholds that establish a window of interest for monitoring the voltage at CI node. As an example, CI node may be set for a nominal voltage of 1.2 V and programmable voltage thresholds 306 and 308 have respective ranges of non-volatile programmable values from 1.2 V to 1.2 V plus 10% and 1.2 V to 1.2 V minus 10%, in 10 step programmable increments.

Voltage comparators 302 and 304 may also employ programmable hysteresis. For example, voltage comparators 302 and 304 may each have a programmable hysteresis range of 20 mV divided into four steps along with user programmable alternating current (AC) filtering to either react to or ignore power line glitches. Additionally, an additional set of voltage comparators (not shown) may be provided to allow simultaneous voltage and current monitoring, which would reduce the number of required pins but increase the number of input signals for CPLD 202. Possible regions of interest for CPLD 202 may be whether the values are inside or outside the window of interest or whether a single threshold or both thresholds are exceeded.

As discussed above, AIM 204 can monitor various functions such as voltage, current, and diode bias or temperature. Thus, circuit 300 includes an attenuation stage 310 for attenuating the monitored voltage to the CI node voltage of 1.2 V. A user may use fuses to select the voltage to be monitored or a range of interest. As an example, attenuation stage 310 may include a voltage divider network 314 having resistors that step down the monitored input voltage to the nominal 1.2 V and switches 312 that are employed to select the desired attenuation.

The attenuation impedance of voltage divider network 314 relates to the impedance of voltage comparators 302 and 304 and that it is generally desired to minimize the current flow through voltage divider network 314. Generally, the turn-on or on-state resistance (Ron) of switches 312 will be insignificant relative to the high impedances of voltage comparators 302 and 304. Switches 312 are switched off if voltage monitoring is not desired.

Circuit 300 monitors current by utilizing a differential amplifier 330 having two input pins (e.g., AIM[x] and AIM[x+1]) connected by an external resistor (Rsense). As shown, an external resistor network 334, which includes resistor Rsense along with a resistor Rload, is placed in the supply path of the power supply of interest and the power supply current (Isup) through Rsense is monitored by differential amplifier 330. Differential amplifier 330 amplifies the voltage drop across resistor Rsense to provide an output value to voltage comparators 302 and 304 when switch 332 is switched on. As an example, differential amplifier 330 may be selected with a high common mode input range (e.g., preferably 12 V, minimum of 5 V) determined by the supply voltage to be monitored and an input offset voltage less than 10 mV. Rsense may be selected to result in a 100 mV drop at nominal Isup so that a gain of twelve produces a nominal 1.2 V at CI node.

Circuit 300 monitors temperature by utilizing an external diode 354 (in this instance, implemented by a properly configured transistor) across two pins (e.g., AIM[x] and AIM[x+1]) so that the forward drop of the diode 354 can be used to sense the substrate temperature on a device. Three current sources 340, 342, and 352, a measure control circuit 336, an absolute base-to-emitter voltage ("Vbe") correction circuit 338, and a number of switches 344, 348, and 350 are also employed to compensate or correct for the absolute value of Vbe between devices and to enable temperature sensing. In order to compensate for the absolute value of Vbe of the substrate diode 354, the bias current is set, for example, to 100 µA and 10 µA through current sources 340, 342, and 352, controlled by measure control circuit 336 through switch 346 and proper selection of switches 348, 350. The difference between the two current measurements or Vbe values is determined, with the result scaled by absolute Vbe correction circuit 338 and provided at CI node by setting switch 344.

As discussed above, attenuation may be required for monitoring voltage. Additionally, gain may be required when performing current or temperature monitoring, for example. Consequently, a programmable gain stage may be employed to provide the necessary gain to raise the measured voltage to the desired voltage at CI node under nominal conditions. Furthermore, one or more filters at the input terminal may supply noise attenuation of a certain amount over a certain frequency range, with a filter pole programmable over a number of steps (e.g., four) across the frequency range. Thus, circuit 300 provides analog input signal monitoring and can be configured for voltage window comparisons, supplying a diode bias, or coupling with an adjacent pin to perform differential voltage comparisons for current measurements. Additionally, each pin of circuit 300 may be configured as a supply voltage (Vcc) pin such that the enabled pin with the highest supply voltage supplies power to programmable power management system 200.

FIG. 4 shows a schematic block diagram of a circuit 400 for implementing oscillator 218 in programmable power management system 200. As discussed previously in reference to FIG. 2, oscillator 218 may generate an internal clock or receive an external clock to provide timing for programmable power management system 200. FIG. 4 shows circuit 400 configured as an oscillator and comprising buffers 402, 404, and 408 (e.g., inverters or operational amplifiers), resistors R and 10R (i.e., ten times the value of R), and capacitor C. Circuit 400 provides an output frequency of 1/(RC), with capacitor C being external and placed across input pins Clock and CIN. Switch 406 controls buffer 404 and determines whether an internally generated frequency or an external clock is provided to buffer 408. FIG. 5 shows a schematic block diagram of the circuit 400 of FIG. 4 configured for an external clock signal input in accordance with an embodiment of the present invention. The capacitor C is removed and an external clock source is provided at the Clock pin and switch 406 prevents buffer 404 from providing an internally generated signal at the input terminal to buffer 408. Overall, circuit 400 provides an inexpensive and reliable clock source for autonomous operation or accepts and conditions an external clock source for programmable power management system 200.

Figure 6:
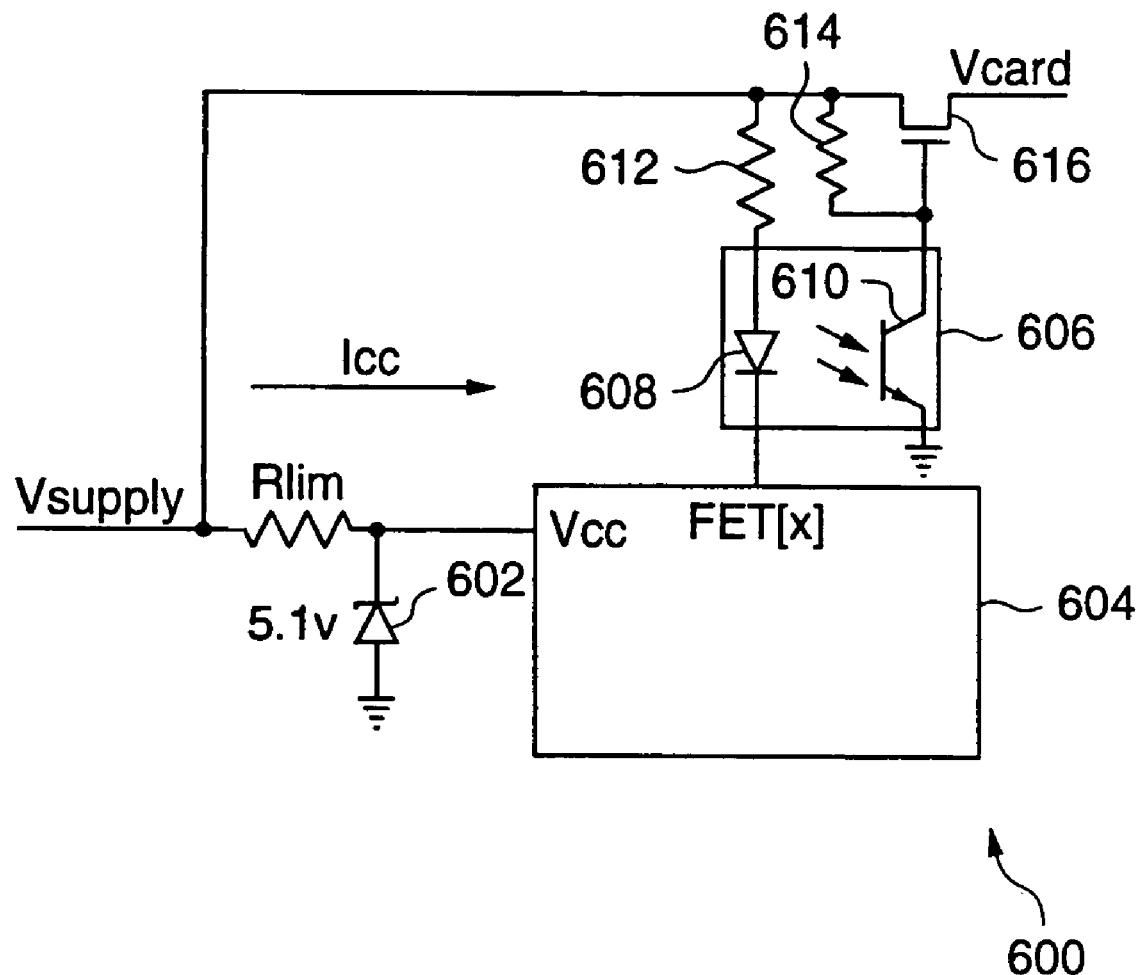
FIG. 6 shows an exemplary schematic block diagram of a high voltage supply application for a programmable power management system in accordance with an embodiment of the present invention.

FIG. 6 shows a schematic block diagram of a high voltage supply system 600 incorporating a programmable power management system 604 in accordance with an embodiment of the present invention. High voltage supply system 600 includes a high supply voltage (Vsupply), a resistor Rlim, a diode 602, a resistor 612, a resistor 614, transistor 616, a switch 606, which includes a diode 608 and a phototransistor 610, and programmable power management system 604. High voltage supply system 600 is an exemplary application for programmable power management system 604 under the circumstances where a high voltage supply is provided. In general, programmable power management system 604 strives for low current consumption while ensuring that digital and FET drive output signals (FET[x]) are valid at operational supply voltages. For example, as voltage Vcc varies in voltage from operational supply voltages to nominal Vcc voltage levels, programmable power management system 604 provides stable FET drive outputs that, if switched off, remain off and digital output signals that are valid in their default state while Vcc voltage levels vary.

Programmable power management system 604 strives for low current consumption (i.e., a low input current denoted as Icc) and prefers supply voltages of 5 V or less. Where a high supply voltage is used, resistor Rlim and diode 602 (e.g., a zener diode) or a low dropout voltage regulator may be utilized to provide an appropriate Vcc voltage level. In operation, resistor Rlim and diode 602 drops the supply voltage level to approximately 5 V for pin Vsupply. Vsupply is also connected to resistors 612 and 614, and transistor 616, with FET drive output signal FET[x] of programmable power management system 604 controlling the on-off condition of diode 608 and, consequently, phototransistor 610. Thus, FET drive output signal FET[x] determines the on-off condition for transistor 616 that provides the supply voltage to system devices such as a printed circuit board.

Resistor Rlim and diode 602 can be implemented as surface mount components. However, such components are limited to power dissipation of about one watt, with resistor Rlim generally the limiting factor. Therefore, a low input current (i.e., a low current for Icc) is required. Table 2 illustrates exemplary operational values for various supply voltages and input currents.

TABLE 2

Exemplary Supply Voltage and Current Values

| Supply Voltage (v) | Icc (mA) Requirement for Rlim; Pdiss = 1 W and VCC = 5 V | Icc (mA) Requirement for Rlim; Pdiss = 1 W and VCC = 3.3 V | Icc (mA) Requirement for Rlim; Pdiss = 1 W and VCC = 2.5 V | Icc (mA) Requirement for Rlim; Pdiss = 1 W and VCC = 1.8 V |
|---|---|---|---|---|
| 48 | 23 | 22 | 22 | 22 |
| 24 | 52 | 48 | 47 | 45 |
| 12 | 142 | 115 | 105 | 98 |

Figure 7:
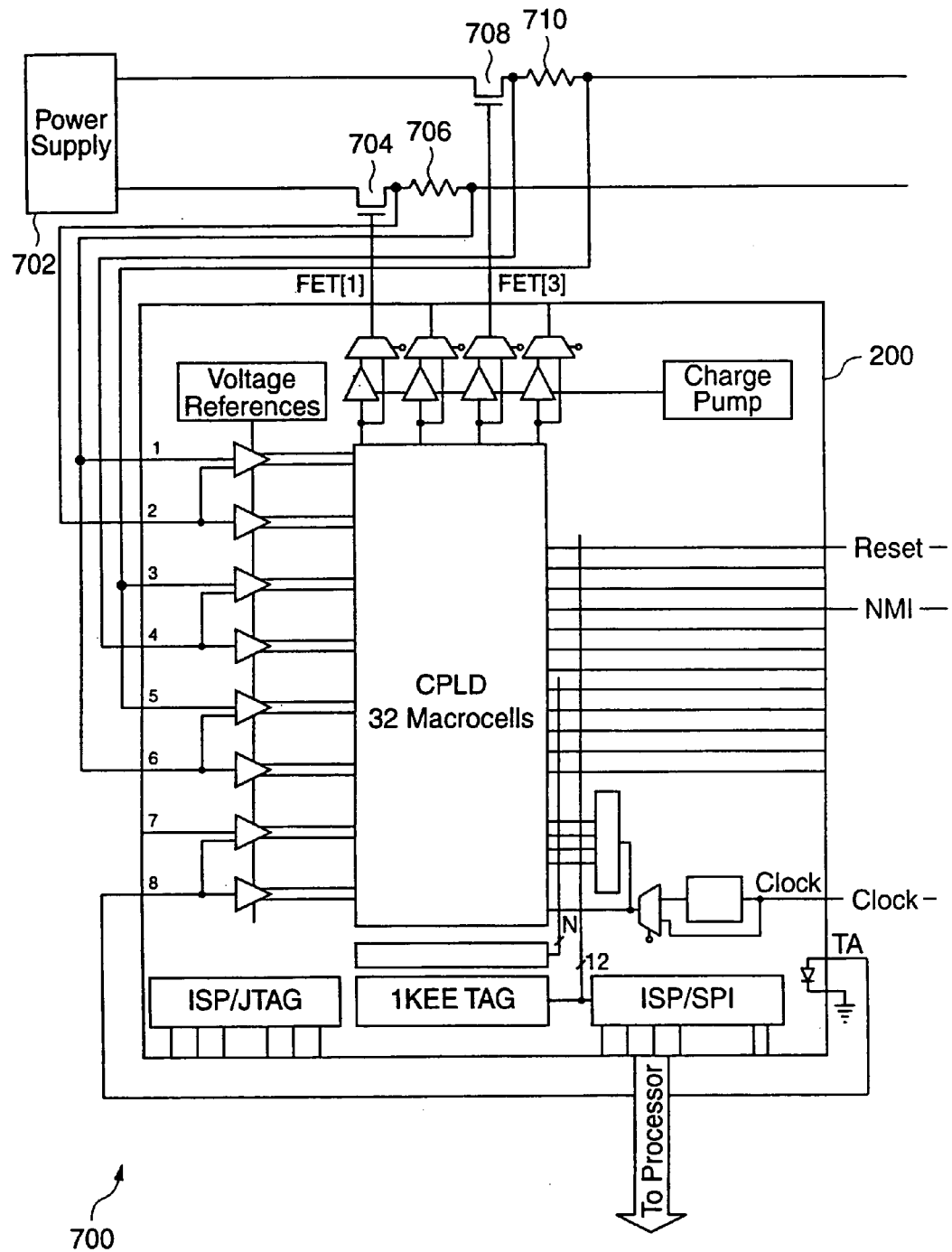
FIG. 7 shows an exemplary application of a programmable power management system in accordance with an embodiment of the present invention.

FIG. 7 shows an exemplary system 700 incorporating programmable power management system 200 in accordance with an embodiment of the present invention. System 700 includes a power supply circuit 702, transistors 704, 708, resistors 706, 710, and programmable power management system 200. System 700 illustrates an exemplary application for programmable power management system 200. Power supply circuit 702 generates certain voltages and provides these to transistors 704, 708. Programmable power management system 200 controls whether transistors 704, 708 are switched on or off through FET drive output signals FET[1], FET[3], respectively.

Programmable power management system 200 also monitors the voltage across and the current through resistors 706, 710 to ensure that the voltages and currents are within the programmed limits. More specifically, as described above in detail in reference to FIGS. 2 and 3, programmable power management system 200 utilizes AIMs 204 to monitor the current through resistor 706 (e.g., at input pins 1 and 2) and to monitor the current through resistor 710 (e.g., at input pins 3 and 4). Additionally, programmable power management system 200 utilizes AIMs 204 to monitor the voltage at resistor 706 (e.g., at input pin 6) and the voltage at resistor 710 (e.g., at input pin 5). Furthermore, programmable power management system 200 monitors its own temperature through pin TA to one AIM 204 at pin 8.

If any programmable limits for the voltage, current, or temperature values are crossed, programmable power management system 200 generates an alarm, a reset, or an interrupt signal, or provides an indication through LEDs. For example, programmable power management system 200 may communicate this information to processors of system 700 through serial interface 224 or reset one or more components of system 700 by cycling the transistors 704, 708. Tables 3–6 provide exemplary operating, DC electrical, AC electrical, and digital characteristics, respectively, for a programmable power management system 200.

TABLE 3

Exemplary DC Operating Characteristics
DC Operating Characteristics

| Parameter | Symbol | Min | Typ | Max | Units | Notes |
|---|---|---|---|---|---|---|
| Temp. Range | Vcc | −40 | | 85 | ° C. | |
| Supply Voltage | Vcc | 1.6 | | 5.5 | V | |
| Supply Current | Icc | | 10 | 20 | mA | |
| Digital I/O Supply Voltage | Vccio | 1.7 | | 5.5 | V | |
| Operating Supply Voltage | Vop | 1 | | | V | Outputs Valid |
| Output Low Current | Iol | | 12 | | mA | |
| Output High Current | Ioh | | −3.2 | | mA | |

TABLE 4

Exemplary DC Electrical Characteristics
DC Electrical Characteristics

| Parameter | Symbol | Min | Typ | Max | Units | Notes |
|---|---|---|---|---|---|---|
| Vs Threshold Range | | | | | | |
| 5v | Vcc5 | 4.5 | | 5.5 | V | |
| 3.3v | Vcc3 | 3.0 | | 3.6 | V | |
| 2.5v | Vcc2 | 2.25 | | 2.75 | V | |
| 1.8v | Vcc1 | 1.6 | | 2.0 | V | |
| Vs Threshold Resolution | | | 5 | | % | Of Range |
| Vs Threshold Accuracy | | | +/−2.5 | | % | |
| Current Sense Accuracy | | | +/−2.5 | | % | Vsense = 100mV |
| Diode Bias Current | Ibias1 | | 10 | | uA | |
| | Ibias2 | | 100 | | uA | |
| Vd Threshold Range | | | | | | Diode Vdrop |
| Vd Threshold Resolution | | | 500 | | uV | |
| Vd Threshold Accuracy | | | 1 | | mV | |
| Comparator Hysteresis | Vhys1 | | 50 | | mV | |
| | Vhys2 | | 100 | | mV | |
| | Vhys3 | | 200 | | mV | |
| | Vhys4 | | 200 | | mV | |

TABLE 4-continued

Exemplary DC Electrical Characteristics
DC Electrical Characteristics

| Parameter | Symbol | Min | Typ | Max | Units | Notes |
|---|---|---|---|---|---|---|
| Temp Diode Gain | | | 2.2 | | mV/°C. | |
| Temp Measurement Accuracy | | | | +/−2.5 | % | Note 2 |
| FET Drive Voltage | Dv5 | 15 | | | V | Vgs = 10v |
| | Dv3 | 8 | | | V | Vgs = 4.5v |
| | Dv2 | 5.5 | | | V | Vgs = 2.7v |
| | Dv1 | 2.7 | | | V | |
| FET Gate Capacitance | | 110 | | 3500 | pF | |
| FET Drive Current | | .004 | | 35 | uA | Note 1 |
| Comparator PSRR | | | | +1 | mV/V | |

Note 1: Assumes 3500 pF gate capacitance, 1 mS ramp time and Vgs of 10v.
Note 2: Using internal temperature diode.

TABLE 5

Exemplary AC Electrical Characteristics
AC Electrical Characteristics

| Parameter | Symbol | Min | Typ | Max | Units | Notes |
|---|---|---|---|---|---|---|
| Clock Input Frequency | Finp | | | 10 | MHz | |
| Clock Oscillator Frequency | Fosc | 0.1 | | 10 | MHz | |
| Clock Oscillator Accuracy | | | 10% | | | |
| FET Drive Ramp Time | Drt1 | | 1 | | mS | Note 1 |
| | Drt2 | | 10 | | mS | Note 1 |
| | Drt3 | | 50 | | mS | Note 1 |
| | Drt4 | | 100 | | mS | Note 1 |
| FET Drive Discharge current | Islow | 75 | 200 | 500 | uA | |
| | Ifast | 0.4 | 1 | 2.7 | mA | |

Note 1: 10%–90% Fullscale

TABLE 6

Exemplary Digital Characteristics
Digital Characteristics

| Parameter | Symbol | Min | Typ | Max | Units |
|---|---|---|---|---|---|
| Supply Voltage | Vcc | 1.7 | | 5.5 | V |
| Digital I/O Supply Voltage | Vccio | 1.7 | | 5.5 | V |

Figure 8:
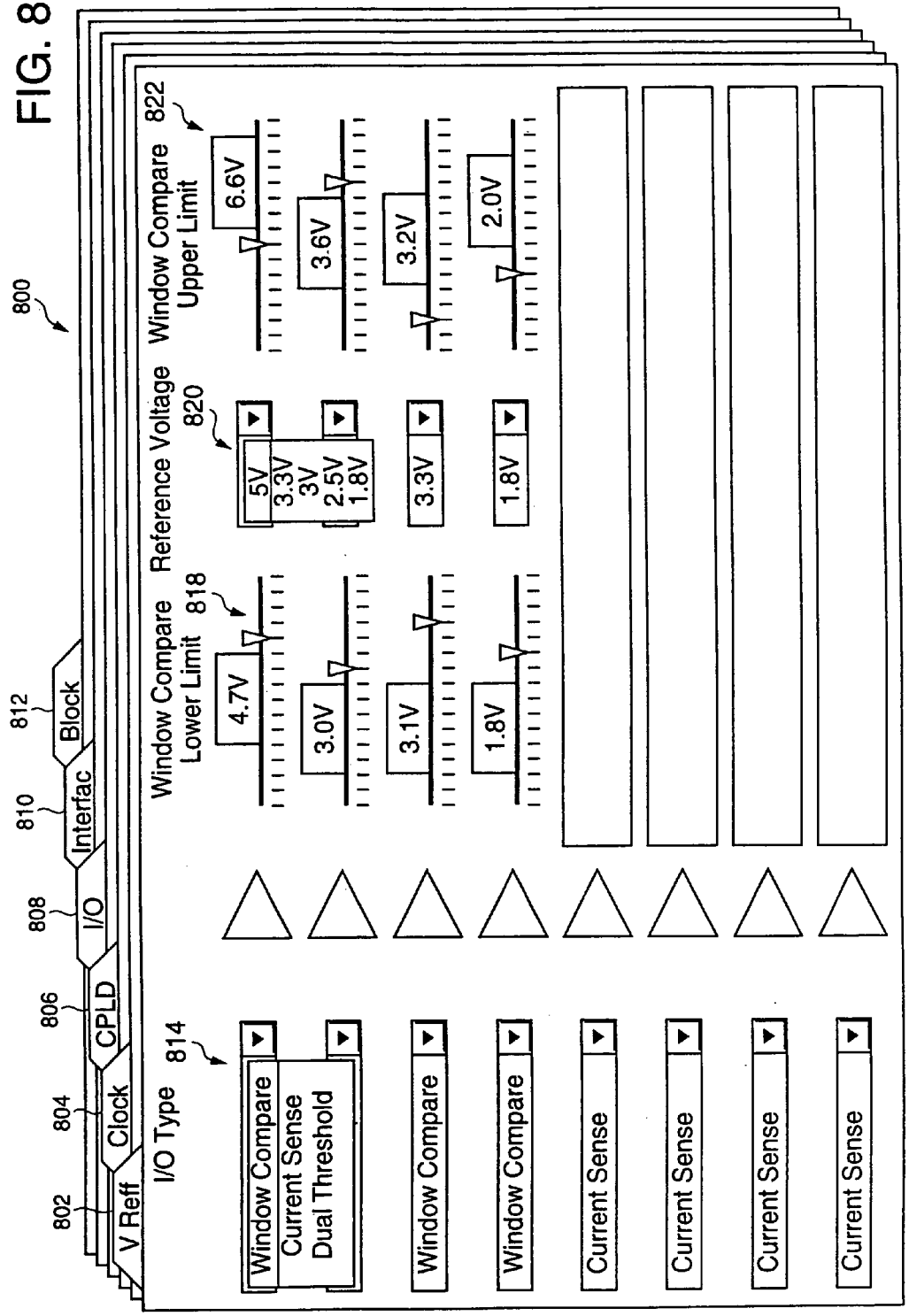
FIG. 8 illustrates a graphical user interface having a number of screen displays to assist in programming a programmable power management system in accordance with an embodiment of the present invention.

FIG. 8 illustrates a graphical user interface 800 having a number of screen displays to assist a user in programming programmable power management system 200 in accordance with an embodiment of the present invention. As noted earlier, programmable power management system 200 allows a user to set various values and select various options among many programmable features. Graphical user interface 800 provides exemplary selectable screen displays or windows that allow a user through a computer or other device to view these selectable windows and program programmable power management system 200. Graphical user interface 800, in FIG. 8, illustrates a voltage reference (Vref) window 802 that allows a user to program various features relative to AIMs 204. Vref window 802 allows a user to select from pull-down window 814 features such as window compare, current sense, or dual threshold and set corresponding values based on the selection made from pull-down window 814. For example, a window compare 818 allows a user to set the lower voltage limit, a window compare 822 allows a user to set the upper voltage limit, and a reference voltage 820 allows the setting of the appropriate reference voltage value.

As shown in graphical user interface 800, the user may select using selectable tabs various other windows for programming, as shown. These windows may include a clock window 804, a CPLD window 806, an I/O window 808, an interface window 810, and a block window 812.

Figure 9:
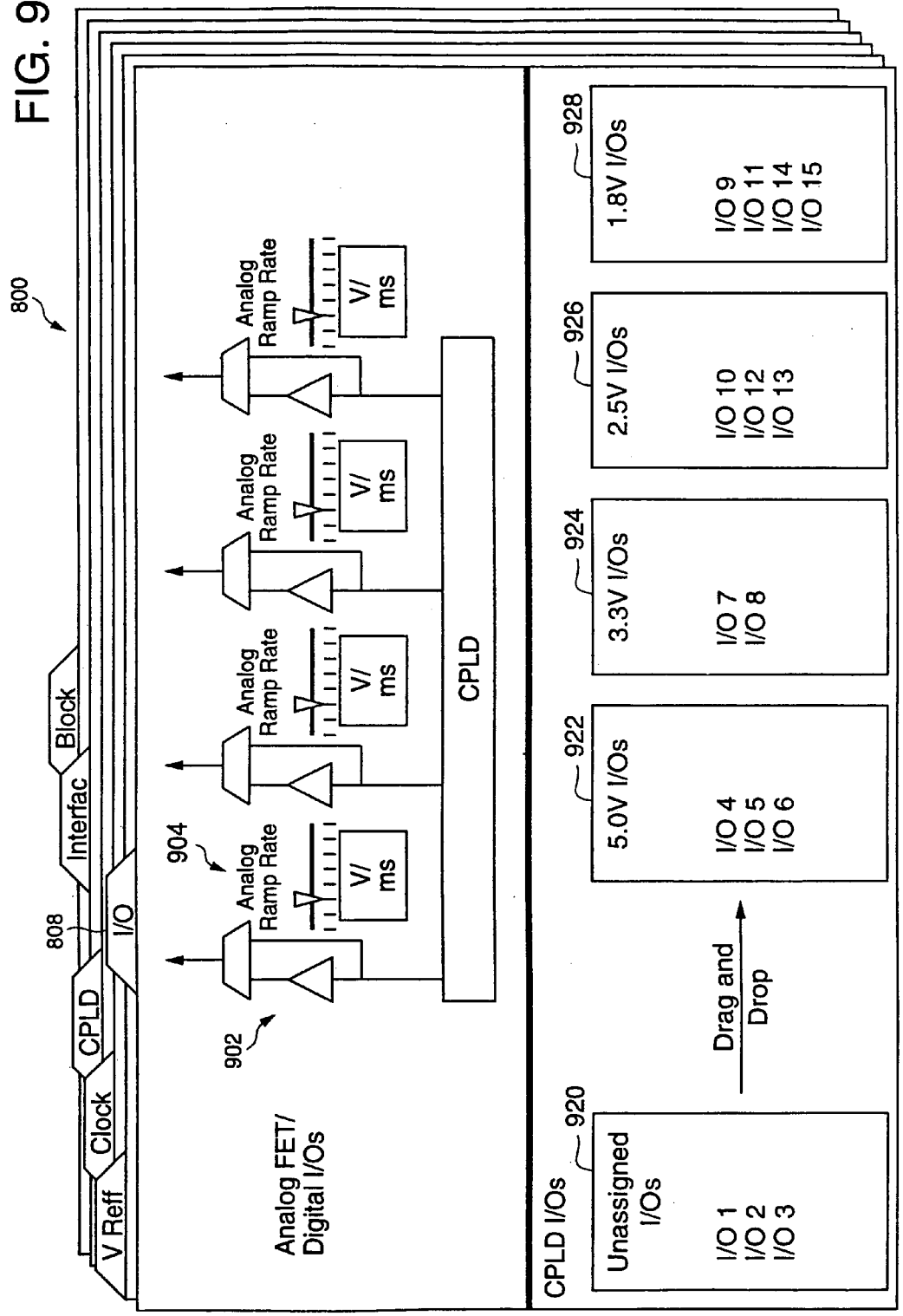
FIG. 9 illustrates a graphical user interface for programming input and output signals for a programmable power management system in accordance with an embodiment of the present invention.

FIG. 9 illustrates graphical user interface 800 that shows I/O window 808 for programming input and output signals for programmable power management system 200 in accordance with an embodiment of the present invention. I/O window 808 allows a user to define various input and output pins and values corresponding to FET drivers 207. For example, I/O window 808 shows FET drivers 207 illustrated symbolically as circuits 902 and provide a user with an analog ramp rate 904 that a user can set to the desired value. Input and output voltages are also programmable through a CPLD table 920, a 5.0 V table 922, a 3.3 V table 924, a 2.5 V table 926, and a 1.8 V table 928. A user would program these input and output voltages by dragging the desired value from CPLD table 920 to the appropriate voltage table (i.e., to 5.0 V table 922, 3.3 V table 924, 2.5 V table 926, and 1.8 V table 928).

FIG. 10 illustrates graphical user interface 800 that shows clock window 804 for programming various clock features. Clock window 804 allows a user to select the desired frequency of oscillator 218 through frequency selector 1002 or select an external clock. The user can also select various options corresponding to pre-scaler circuit 216 such as assigning counter values or linking certain counters together via counter display 1004.

FIG. 11 illustrates graphical user interface 800 that shows CPLD window 806 for programming various features of CPLD 202. CPLD window 806 includes a menu bar 1102 having pull-down windows such as Import Files, Synthesis, Compiler, and Output Files, a text editor selector 1108, a synthesis selector 1110, a compiler selector 1112, and a current files table 1106. CPLD window 806 allows a user to import or output files, perform editing or compiling, and manage the programmable features of CPLD 202.

Interface window 810 of graphical user interface 800 is illustrated in FIG. 12. Interface window 810 allows a user to select the data format through data selector 1202, the type of interface through programming interface selector 1204, and the text file to store in tag 228 by using tag file selector 1206. It should be understood that graphical user interface 800 illustrates exemplary screens that assist a user in programming a programmable power management system in accordance with an embodiment of the present invention and that many variations are possible in accordance with the principles of the present invention.

Embodiments described above illustrate but do not limit the invention. It should also be understood that numerous modifications and variations are possible in accordance with the principles of the present invention. Accordingly, the scope of the invention is defined only by the following claims.

The invention claimed is:

1. A power management integrated circuit comprising:
a plurality of input terminals adapted to receive analog input voltage signals;
a plurality of analog input monitor circuits coupled to the input terminals, each analog input monitor circuit operable to compare an input analog voltage received at an input terminal against at least one voltage reference;
control logic coupled to the plurality of analog input monitor circuits and operable to generate at least one control signal in response to output signals from the analog input monitor circuits; and
at least one FET driver circuit coupled between the control logic and an output terminal and capable of controlling a power switch, the FET driver circuit operable in response to a control signal from the control logic,
wherein the control logic is operable, in response to an output signal from an analog input monitor circuit, to generate a ramp control signal that gradually turns on the FET driver circuit.

2. The integrated circuit of claim 1, wherein at least one analog input monitor circuit is operable to compare an input analog voltage against high and low voltage references.

3. The integrated circuit of claim 1, wherein at least one analog input monitor circuit is operable to compare a first input analog voltage received at a first input terminal to a second input analog voltage received at a second input terminal.

4. The integrated circuit of claim 1, wherein at least one analog input monitor circuit is operable to monitor the voltage across an external resistor by comparing the voltages, and the control logic is operable to generate an indicator signal in response to the output signal from the analog input monitor circuit.

5. The integrated circuit of claim 1 including a programmable voltage reference generator.

6. The integrated circuit of claim 1 including a plurality of FET driver circuits, wherein the control logic is programmable to generate a plurality of respective ramp control signals to turn on the FET driver circuits in a programmed sequence.

7. The integrated circuit of claim 1, wherein the control logic is programmable.

8. The integrated circuit of claim 7, wherein the control logic includes a plurality of macrocells.

9. The integrated circuit of claim 1, wherein the FET driver circuit is programmable.

10. The integrated circuit of claim 1 including a charge pump circuit coupled to the FET driver circuit.

11. The integrated circuit of claim 1, wherein the FET driver circuit comprises an FET driver circuit capable of driving a power MOSFET switch coupled to the output terminal.

12. The integrated circuit of claim 1 including a serial interface coupled to the control logic and operable to support the $I^2C$ protocol.

13. The integrated circuit of claim 7 including nonvolatile programmable memory operable to store information for configuring the control logic.

14. The integrated circuit of claim 1 including a watchdog timer coupled to the control logic and operable to monitor a time-based event.

15. The integrated circuit of claim 1, wherein the control logic is operable to provide a plurality of selectable ramp control signals that vary in the rate at which they turn on the FET driver circuit.

16. The integrated circuit of claim 1, wherein the ramp control signal is generally monotonic and linear.

17. A power management integrated circuit comprising:
a plurality of analog input monitor circuits operable to sense a plurality of power supply output signals;
a plurality of FET driver circuits operable to a control, respectively, a plurality of power switches of the type coupled to output terminals of a power supply; and
programmable control logic coupled to the input monitor circuits and to the FET driver circuits, the control logic configurable to turn on the plurality of FET driver circuits in a programmed sequence and in response to output signals of the analog input monitor circuits wherein the control logic is programmable to provide ramp control signals that gradually turn on the FET driver circuits.

18. The integrated circuit of claim 17, wherein the control logic is operable to provide a plurality of selectable ramp control signals that vary in the rate at which they turn on each FET driver circuit.

19. The integrated circuit of claim 17 including nonvolatile programmable memory operable to store information for configuring the control logic.

20. A power management integrated circuit comprising:
a plurality of FET driver circuits operable to a control, respectively, a plurality of power switches of the type coupled to output terminals of a power supply; and
programmable control logic coupled to the FET driver circuits, the control logic configurable to turn on the FET driver circuits in a programmed sequence,
wherein the control logic is operable, in response to sensing of power supply signals, to generate ramp control signals that gradually turn on the FET driver circuits in the programmed sequence.

21. The integrated circuit of claim 20, wherein the control logic is operable to provide a plurality of selectable ramp control signals that vary in the rate at which they turn on each FET driver circuit.

22. The integrated circuit of claim 20, wherein the FET driver circuits are programmable.

23. The integrated circuit of claim 20 including nonvolatile programmable memory operable to store information for configuring the control logic.

* * * * *

UNITED STATES PATENT AND TRADEMARK OFFICE
CERTIFICATE OF CORRECTION

PATENT NO. : 7,100,058 B1 Page 1 of 1
APPLICATION NO. : 10/726972
DATED : August 29, 2006
INVENTOR(S) : Tomlinson et al.

It is certified that error appears in the above-identified patent and that said Letters Patent is hereby corrected as shown below:

Col. 16, line 16; Claim 17, line 4: replace "operable to a control" with -- operable to control --.
Col. 16, line 35; Claim 20, line 2: replace "operable to a control" with -- operable to control --.

Signed and Sealed this

Eleventh Day of March, 2008

JON W. DUDAS
*Director of the United States Patent and Trademark Office*